United States Patent
Zheng et al.

(10) Patent No.: US 11,901,626 B2
(45) Date of Patent: Feb. 13, 2024

(54) PRODUCTION METHOD FOR LUNEBURG LENS

(71) Applicant: Guangdong Fushun Tianji Communication Co. Ltd., Guangdong (CN)

(72) Inventors: Hongzhen Zheng, Guangdong (CN); Yongchao Lu, Guangdong (CN); Yingqian Dou, Guangdong (CN)

(73) Assignee: Guangdong Fushun Tianji Communication Co., Ltd., Guangdong (CN)

(*) Notice: Subject to any disclaimer, the term of this patent is extended or adjusted under 35 U.S.C. 154(b) by 229 days.

(21) Appl. No.: 17/647,473

(22) PCT Filed: Nov. 8, 2019

(86) PCT No.: PCT/CN2019/116604
§ 371 (c)(1),
(2) Date: Jan. 10, 2022

(87) PCT Pub. No.: WO2021/017263
PCT Pub. Date: Feb. 4, 2021

(65) Prior Publication Data
US 2023/0299494 A1    Sep. 21, 2023

(30) Foreign Application Priority Data

Jul. 29, 2019   (CN) .......................... 201910686927.8

(51) Int. Cl.
| | | |
|---|---|---|
| *H01Q 15/08* | (2006.01) | |
| *B29D 11/00* | (2006.01) | |
| *G02B 1/10* | (2015.01) | |
| *G02B 3/00* | (2006.01) | |

(52) U.S. Cl.
CPC ....... *H01Q 15/08* (2013.01); *B29D 11/00432* (2013.01); *B29D 11/00836* (2013.01); *G02B 1/10* (2013.01); *G02B 3/0087* (2013.01); *G02B 2003/0093* (2013.01)

(58) Field of Classification Search
CPC .............. H01Q 15/08; B29D 11/00432; B29D 11/00836; G02B 1/10; G02B 3/0087; G02B 2003/0093
See application file for complete search history.

(56) References Cited

U.S. PATENT DOCUMENTS

| | | | | |
|---|---|---|---|---|
| 6,407,708 B1 * | 6/2002 | Jasper, Jr. | .............. | H01Q 15/08 343/754 |
| 7,224,533 B2 * | 5/2007 | Lerner | ................... | G02B 5/128 359/534 |
| 7,671,820 B2 * | 3/2010 | Tokoro | ................... | H01Q 15/08 343/753 |
| 7,898,477 B1 * | 3/2011 | Oxley | ................. | H01Q 3/2658 342/447 |
| 8,496,340 B2 * | 7/2013 | Budd | ..................... | G02B 5/286 359/542 |
| 11,385,384 B2 * | 7/2022 | Diehl | ................... | G02B 3/0087 |

FOREIGN PATENT DOCUMENTS

| | | | |
|---|---|---|---|
| CN | 106025565 A | 10/2016 | |
| CN | 207883903 U | 2/2018 | |
| CN | 109994837 A | 7/2019 | |
| CN | 110401039 A | 11/2019 | |
| WO | 2018096306 A1 | 5/2018 | |
| WO | WO-2020190331 A1 * | 9/2020 | ............. H01Q 15/08 |

OTHER PUBLICATIONS

International Search Report dated Apr. 24, 2020 issued in connection with International Application No. PCT/CN2019/116604 (2 pages total).

R. K. Luneburg, Mathematical Theory of Optics, Brown University Press, Providence, RI, 1944, pp. 189-213, accessible here: "https://www.worldcat.org/title/mathematical-theory-of-optics/oclc/555173", last accessed Feb. 2, 2022.

Mathematical Theory of Optics. R. K. Luneburg. With a foreword by Emile Wolf and supplementary notes by M. Herzberger. University of California Press, Berkeley, 1964, accessible here: "science.org/doi/10.1126/science.147.3663.1276.b", last accessed Feb. 2, 2022.

\* cited by examiner

*Primary Examiner* — Seung H Lee
(74) *Attorney, Agent, or Firm* — Tatonetti IP

(57) ABSTRACT

The present disclosure provides a production method for a Luneburg lens, which can manufacture a Luneburg lens with stable indexes and high performance under the conditions of room temperature, normal pressure, and low cost. The production method includes the following steps: bonding first granular materials into a sphere by a bonding agent, so as to obtain a sphere core; spraying the bonding agent on the surface of the sphere core, placing the sphere core in a container containing second granular materials, and rolling the sphere core, so that the surface of the whole sphere core is bonded with the second granular materials until the thickness of the second granular particles reaches a preset range, and thus forming a dielectric layer coating the sphere core; and by analogy, preparing a predetermined number of dielectric layers, so as to obtain a target finished Luneburg lens.

10 Claims, No Drawings

PRODUCTION METHOD FOR LUNEBURG LENS

CROSS-REFERENCES TO RELATED APPLICATIONS

This Non-Provisional Utility Patent Application is a National Stage Application that claims the benefit of and priority to PCT Application Serial No. PCT/CN2019/116604, entitled "Production Method for Luneburg Lens," filed Nov. 8, 2019, which claims the benefit of and priority to Chinese Patent Application Serial No. 201910686927.8, entitled "Production Method for Luneburg Lens," filed Jul. 29, 2019, the entire contents of both applications of which are hereby incorporated herein by reference.

TECHNICAL FIELD

The present disclosure relates to the field of communication device production, more particularly, to a production method for a Luneburg lens.

BACKGROUND

A Luneburg lens technology, proposed by RK Luneburg in 1944 on the basis of geometric optics, is used for applications of antennas and scattering bodies. It is mainly used in a fast scanning system, a satellite communication system, 5G communication, an automobile anti-collision radar, and a radar reflector.

Theoretically, a dielectric constant of a dielectric material used for a Luneburg lens should vary continuously from 2 to 1 from a sphere center to an outside diameter following certain mathematical laws. However, such an ideal dielectric does not exist in nature, so a discrete spherical shell of a layered design is often used for replacing in practical design.

In order to make the actual performance of the Luneburg lens close to the theoretical performance, there are many solutions for producing the Luneburg lens, such as:
- a method for manufacturing a hemispherical Luneburg lens antenna;
- a production method for a Luneburg lens in an opening structure form;
- a cylindrical Luneburg lens antenna with an extremely low profile based on a novel dielectric filling mode;
- a method for manufacturing a Luneburg lens; and
- a Luneburg lens antenna.

The above technical solutions include: a hole drilling method. The dielectric constant of a material is controlled by the proportion of the volume of a hole to that of the material. However, in this method, the hole drilling density and accuracy are not easy to control, the structure is complex, the manufacturing difficulty is great, the weight is heavy, and the method is not suitable for batch production.

A method of foaming layer by layer is also included, which wraps layer by layer and foams layer by layer by taking a central sphere core as a basis. This is the most commonly used method for obtaining a foaming material with step dielectric constants at present. However, no matter physical foaming or chemical foaming requires strict control of temperature and pressure. Production is usually performed at a high temperature and a high pressure, and since the thermal conductivity of the foaming material is very low, a phenomenon of non-uniform foaming will be formed. The process has a complex technology, special devices are needed, the yield is low, and the cost is very high.

A layered design method is also included. First, layers are manufactured separately, and then these layers are bonded together. However, interfaces between the layers are obvious. The discontinuity of the dielectric constants between layers of an electromagnetic material will increase the electromagnetic loss of a lens and reduce the radiation efficiency of an antenna.

Therefore, it is necessary to improve the existing production method for the Luneburg lens.

SUMMARY

Technical Problems

The technical problem to be solved by the present disclosure is to provide a new production method for a Luneburg lens, which can manufacture the Luneburg lens with stable indexes and high performance under the conditions of room temperature, normal pressure, and low cost.

Solutions for Problems

Technical Solutions

The following technical solutions are adopted:

A production method for a Luneburg lens includes the following steps:

Step 1), bonding a number of first granular materials into a sphere by a bonding agent, so as to obtain a sphere at a first stage, and the sphere at the first stage being called a sphere core;

Step 2), spraying the bonding agent on a surface of the sphere core, placing the sphere core in a container containing second granular materials before the bonding agent is dried and cured, and rolling the sphere core, so that the surface of the whole sphere core is bonded with the second granular materials; during the process, supplementing and spraying the bonding agent as required and continuing rolling the sphere core until the thickness of the second granular materials bonded to the surface of the sphere core reaches a preset range, these second granular materials thus forming a dielectric layer coating the sphere core, the dielectric layer formed by the second granular materials being called a first dielectric layer, and at this time, the sphere at the first stage growing into a sphere at a second stage; and Step 3), spraying the bonding agent on a surface of the first dielectric layer, placing the sphere at the second stage in a container containing third granular materials before the bonding agent is dried and cured, and rolling the sphere at the second stage, so that the surface of the whole first dielectric layer is bonded with the third granular materials; during the process, supplementing and spraying the bonding agent as required and continuing rolling the sphere at the second stage core until the thickness of the third granular materials bonded to the surface of the sphere at the second stage reaches a preset range, these third granular materials thus forming another dielectric layer coating the previous dielectric layer, the another dielectric layer being called a second dielectric layer, and at this time, the sphere at the second stage growing into a sphere at a third stage.

By analogy, a Luneburg lens with a predetermined number of dielectric layers is prepared. The dielectric constants of the granular materials used from an innermost sphere core to an outermost dielectric layer follow the law from high to low. A target value of the dielectric constant of the first granular material is 2, and a target value of the dielectric constant of the granular material used by the outermost dielectric layer is 1.

The Luneburg lens adopts a method of growing from inside to outside. A sphere of a next stage with a larger diameter is grown by bonding different granular materials by taking the sphere of the last stage as a basis, so that a final sphere is of a multilayer structure in the radial direction. The multilayer structure is a layered structure of a plurality of dielectric layers. However, a boundary between the dielectric layers will form a two-phase composite part due to mutual embedding between particles. The dielectric constant of the two-phase composite part is between the dielectric constants of the two granular materials, so that the changes of the dielectric constants between the dielectric layers and between a dielectric layer and the sphere core of such Luneburg lens are gentle. Therefore, the electromagnetic loss of a finished Luneburg lens can be reduced.

According to the Luneburg lens produced by the production method, the contour shape may be a sphere, a quasi sphere, an ellipsoid, a quasi ellipsoid, or the like.

In the production method, the total number of the dielectric layers is preferably between 3 and 20.

In the production method, the structures of the granular materials used by each dielectric layer and the sphere core are preferably that: granular or fibrous metal conductors are mixed in a non-metal material.

In the production method, from the sphere core to the outermost dielectric layer, the volumes of the corresponding granular materials are preferably larger and larger.

In the production method, from the sphere core to the outermost dielectric layer, the shapes of the corresponding granular materials may be cubic or spherical.

In the production method, the volume of the granular materials is preferably in a range of 8 mm$^3$ to 250 mm$^3$.

BENEFICIAL EFFECTS OF THE PRESENT DISCLOSURE

Beneficial Effects

The production method for the Luneburg lens of the present disclosure has the advantages that the production process is simple, the production cost is low, the weight is light, the lens characteristics are easy to control, and the lens performance indexes are excellent.

DETAILED DESCRIPTION

Embodiments of the Present Disclosure

The content of the present disclosure will be further described below in combination with embodiments.

Embodiment 1

The present embodiment takes manufacturing a spherical Luneburg lens with five dielectric layers as an example. Such Luneburg lens includes a sphere core, a first dielectric layer, a second dielectric layer, a third dielectric layer, a fourth dielectric layer, and a fifth dielectric layer in sequence from inside to outside. The materials corresponding to the sphere core and these dielectric layers in sequence are: a first granular material, a second granular material, a third granular material, a fourth granular material, a fifth granular material, and a sixth granular material. The dielectric constants of the first granular material to the sixth granular material are from high to low, where the dielectric constant of the first granular material is 2, and the dielectric constant of the sixth granular material is 1.

A processing method is as follows:

Step 1), a number of first granular materials are bonded into a sphere by a bonding agent, so as to obtain a sphere at a first stage, and the sphere at the first stage is called a sphere core.

Step 2), the bonding agent is sprayed on a surface of the sphere core, the sphere core is placed in a container containing second granular materials before the bonding agent is dried and cured, and the sphere core is rolled, so that the surface of the whole sphere core is bonded with the second granular materials; during the process, the bonding agent is supplemented and sprayed as required and the sphere core is continued to be rolled until the thickness of the second granular materials bonded to the surface of the sphere core reaches a preset range, these second granular materials thus form a dielectric layer coating the sphere core, the dielectric layer formed by the second granular materials is called a first dielectric layer, and at this time, the sphere at the first stage grows into a sphere at a second stage.

Step 3), the bonding agent is sprayed on a surface of the first dielectric layer, the sphere at the second stage is placed in a container containing third granular materials before the bonding agent is dried and cured, and the sphere at the second stage is rolled, so that the surface of the whole first dielectric layer is bonded with the third granular materials; during the process, the bonding agent is supplemented and sprayed as required and the sphere at the second stage core is continued to be rolled until the thickness of the third granular materials bonded to the surface of the sphere at the second stage reaches a preset range, these third granular materials thus form another dielectric layer coating the previous dielectric layer, the another dielectric layer is called a second dielectric layer, and at this time, the sphere at the second stage grows into a sphere at a third stage.

By analogy, a third dielectric layer is prepared on the surface of the second dielectric layer, a fourth dielectric layer is prepared on the surface of the third dielectric layer, and a fifth dielectric layer is prepared on the surface of the fourth dielectric layer. So far, a spherical Luneburg lens with five dielectric layers is prepared.

Subsequently, a film may be coated on the surface of the Luneburg lens and/or the Luneburg lens may be installed in a shell for shaping or protecting the Luneburg lens.

So far, the production of the spherical Luneburg lens is completed.

In the embodiment, the granular materials of each dielectric layer and the sphere core are prepared in advance. Their structures are that: fibrous metal conductors are mixed in a non-metallic foamed material. The dielectric constants of these granular materials may be controlled by only controlling the number or the diameter size of the metal conductors mixed in a single granule. For example, the dielectric constant increases if more metal conductors are added, and the dielectric constant will be greater if larger metal conductors are mixed. A manufacturing method for a granular material may refer to the patent document named "AN ARTIFICIAL DIELECTRIC MATERIAL AND A METHOD OF MANUFACTURING THE SAME" with the Publication No. WO2009078807 and the Publication date of Jun. 25, 2009.

In the case where the dielectric constant and the size of each granular material are set well, the Luneburg lens produced by the production method of the present embodiment has the advantages that the weight is light, the lens characteristics are easy to control, and the lens performance indexes are excellent.

Embodiment 2

The present embodiment takes manufacturing an ellipsoidal Luneburg lens with four dielectric layers as an example.

The difference from Embodiment 1 is that: a number of first granular materials are bonded into an ellipsoid by a bonding agent, so as to obtain a sphere at a first stage. In the process that the sphere at the first stage grows into a sphere at a second stage, the sphere at the second stage finally becomes an ellipsoidal shape, and spheres at a third stage and a fourth stage finally become ellipsoidal shapes.

The description listed in the specification is only preferred embodiments of the present disclosure. Equivalent technical transformations made under the working principle and the idea of the present disclosure are all regarded as the scope of protection of the present disclosure.

What is claimed is:

1. A production method for a Luneburg lens, comprising:
   Step 1), bonding a number of first granular materials into a sphere by a bonding agent, so as to obtain a sphere at a first stage, and the sphere at the first stage being called a sphere core;
   Step 2), spraying the bonding agent on a surface of the sphere core, and placing the sphere core in a container containing second granular materials before the bonding agent is dried and cured, and rolling the sphere core, so that the surface of the whole sphere core is bonded with the second granular materials;
      during the process, supplementing and spraying the bonding agent and continuing rolling the sphere core until the thickness of the second granular materials bonded to the surface of the sphere core reaches a preset range, these second granular materials thus forming a dielectric layer coating the sphere core, the dielectric layer formed by the second granular materials being called a first dielectric layer, and at this time, the sphere at the first stage growing into a sphere at a second stage; and
   Step 3), spraying the bonding agent on a surface of the first dielectric layer, placing the sphere at the second stage in a container containing third granular materials before the bonding agent is dried and cured, and rolling the sphere at the second stage, so that the surface of the whole first dielectric layer is bonded with the third granular materials;
      during the process, supplementing and spraying the bonding agent as required and continuing rolling the sphere at the second stage core until the thickness of the third granular materials bonded to the surface of the sphere at the second stage reaches a preset range, these third granular materials thus forming another dielectric layer coating the previous dielectric layer, the another dielectric layer being called a second dielectric layer, and at this time, the sphere at the second stage growing into a sphere at a third stage,
   wherein,
   a Luneburg lens with a predetermined number of dielectric layers is prepared, in which dielectric constants of the granular materials used from an innermost sphere core to an outermost dielectric layer follow a law from high to low, and a target value of a dielectric constant of the first granular material is 2, and a target value of a dielectric constant of the granular material used by the outermost dielectric layer is 1.

2. The production method for the Luneburg lens of claim 1, wherein a contour shape of the sphere is any one or more of a quasi sphere, an ellipsoid, or a quasi ellipsoid.

3. The production method for the Luneburg lens of claim 1, wherein a total number of the dielectric layers is between 3 and 20.

4. The production method for the Luneburg lens of claim 1, wherein structures of the granular materials used by each dielectric layer and the sphere core include granular or fibrous metal conductors that are mixed in a non-metallic material.

5. The production method for the Luneburg lens of claim 1, wherein from the sphere core to the outermost dielectric layer, volumes of the corresponding granular materials are larger and larger.

6. The production method for the Luneburg lens of claim 1, wherein, from the sphere core to the outermost dielectric layer, the shapes of corresponding granular materials are cubic or spherical.

7. The production method for the Luneburg lens of claim 1, wherein a volume of the granular materials is in a range of 8 $mm^3$ to 250 $mm^3$.

8. The production method for the Luneburg lens of claim 1, wherein a film is coated on a surface of the Luneburg lens.

9. The production method for the Luneberg lens of claim 8, wherein the Luneberg lens is subsequently installed in a shell.

10. The production method for the Luneberg lens of claim 1, wherein the Luneberg lens is subsequently installed in a shell.

* * * * *